United States Patent [19]
Takarasawa et al.

[11] Patent Number: 5,715,115
[45] Date of Patent: Feb. 3, 1998

[54] DISK CHUCKING MECHANISM

[75] Inventors: Noboru Takarasawa; Norihide Yoshida, both of Nagano, Japan

[73] Assignee: Sankyo Seiki Mfg. Co., Ltd., Nagano-ken, Japan

[21] Appl. No.: 678,671

[22] Filed: Jul. 11, 1996

[30] Foreign Application Priority Data

Jul. 14, 1995 [JP] Japan .................. 7-178319

[51] Int. Cl.⁶ .................. G11B 17/02
[52] U.S. Cl. .................. 360/99.05
[58] Field of Search .................. 360/99.04, 99.05, 360/99.08, 99.12

[56] References Cited

U.S. PATENT DOCUMENTS 4,445,155  4/1984  Takahashi et al. .................. 360/99.04
5,311,383  5/1994  Yokouchi .................. 360/99.08

Primary Examiner—Robert S. Tupper
Attorney, Agent, or Firm—McAulay Fisher Nissen Goldberg & Kiel, LLP

[57] ABSTRACT

In accordance with the invention, a disk chucking mechanism comprises a spindle for engaging the center hole of a metallic hub fastened in the center portion of a disk and a turntable that rotates as a single unit with the spindle. A drive pin is provided for engaging an off-center hole provided in the hub at a location off-center with respect to the center of the hub for regulating the movement of the hub. A chucking magnet is included which is fastened to the turntable for magnetically attracting the hub. The chucking magnet has a plurality of magnetic pieces.

12 Claims, 7 Drawing Sheets

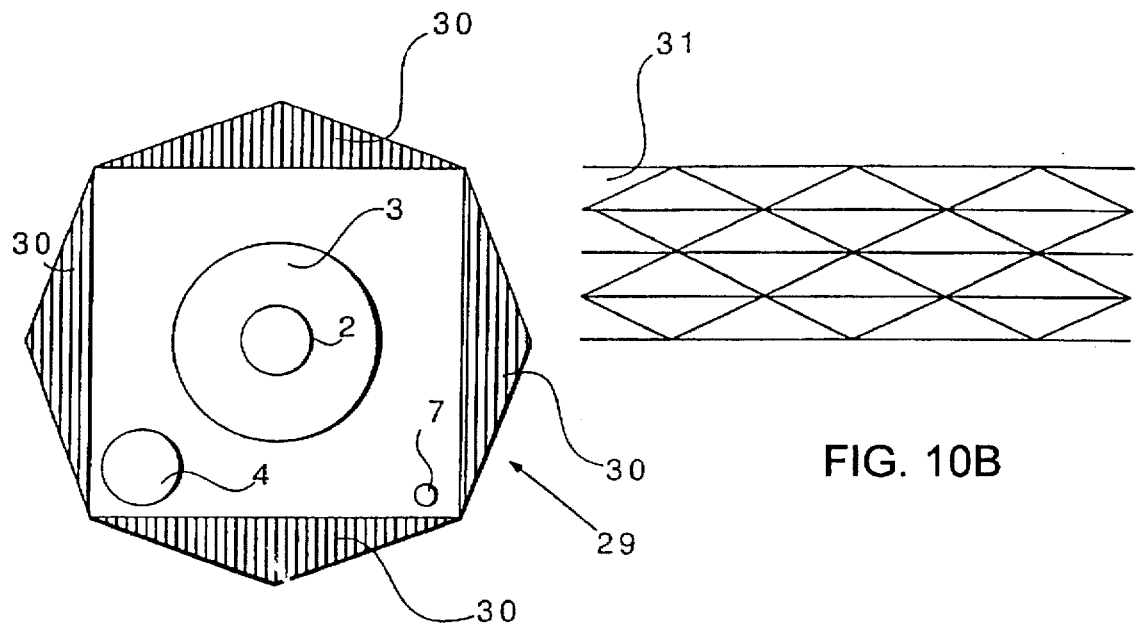
FIG. 10A
FIG. 10B
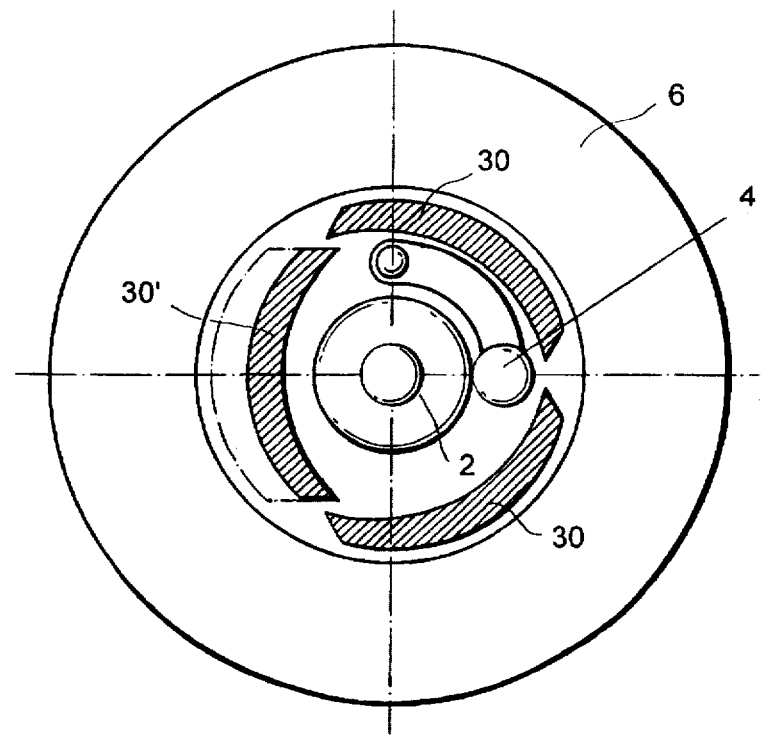
FIG. 11

DISK CHUCKING MECHANISM

BACKGROUND OF THE INVENTION a) Field of the Invention

The present invention relates to a disk chucking mechanism capable of being used in drive systems such as floppy disk drives.

b) Description of the Related Art

Known in the art are magnetic disk drive apparatus for rotating the magnetic media of floppy disk units, such as, for example, the apparatus disclosed in U.S. Pat. No. 5,311,383.

In such related art apparatus, a ring-shaped member, such as that shown as item 32 in FIG. 8 of U.S. Pat. No. 5,311,383, was used as a chucking magnet for magnetically attracting the metallic hub of a floppy disk, etc. The chucking magnet was made ring-shaped because the area in which the chucking magnet could be installed was limited, and also because the magnetic attraction had to be balanced around the circumference of the hub.

This type of chucking magnet 32 in U.S. Pat. No. 5,311,383 was commonly produced by taking a rubber magnet 28, which had been rolled into a sheet, as shown in FIG. 13, and stamping out the predetermined shapes on a press. After a rubber sheet magnet 28 had gone through the stamp press to have the predetermined shapes cut out, however, the stock remaining in the sheet after the chucking magnets 32 had been stamped out could not be used, and had to be handled as scrap.

When the chucking magnets obtainable as finished products from a rubber sheet magnet 28 were compared with the portion that ended up as scrap, it was found that only about 30% of the total rubber magnet stock went into chucking magnets 32, with the remaining 70% ending up as scrap. This was enormously wasteful.

OBJECT AND SUMMARY OF THE INVENTION

The present invention was devised to solve the problems of the related art described above. An object of the present invention is to provide a disk chucking mechanism with which it is possible to limit the amount of material wasted during fabrication of the chucking magnets and thereby contribute to materials cost reduction. A further object is to effect positive chucking of the drive pin in the off-center hole of the disk hub.

In accordance with the invention, a disk chucking mechanism comprises a spindle for engaging the center hole of a metallic hub fastened in the center portion of a disk and a turntable that rotates as a single unit with the spindle. A drive pin is provided for engaging an off-center hole provided in the hub at a location off-center with respect to the center of the hub for regulating the movement of the hub. A chucking magnet is included which is fastened to the turntable for magnetically attracting the hub. The chucking magnet has a plurality of magnet pieces.

For a better understanding of the present invention, reference is made to the following description and accompanying drawings while the scope of the invention will be pointed out in the appended claims.

BRIEF DESCRIPTION OF THE DRAWINGS

In the drawings:

FIG. 10(a) is a plan view showing still another working example of a chucking magnet according to the present invention, and FIG. 10(b) is a plan view showing the manufacture process used to make the magnet pieces;

FIG. 11 is a plan view showing yet another working example of a chucking magnet according to the present invention;

DESCRIPTION OF THE PREFERRED EMBODIMENTS

Figure 1:
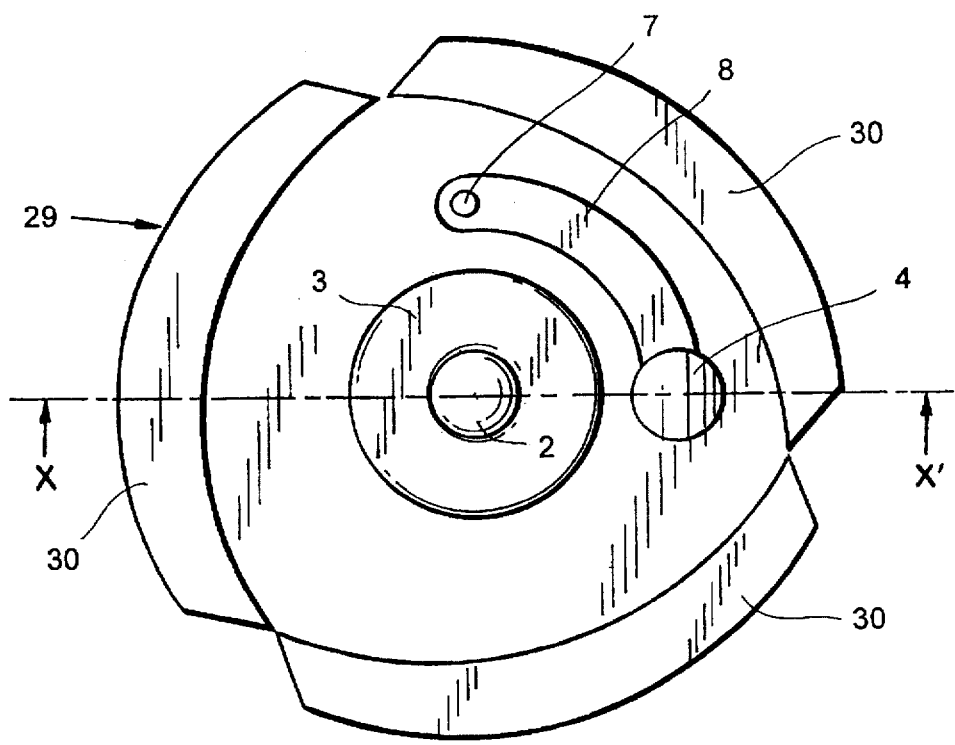
FIG. 1 is a plan view showing the disk chucking mechanism of the present invention.

Working examples of a disk chucking mechanism according to the present invention will now be described with reference to the drawing. Because the basic configuration of the disk drive apparatus is essentially the same as that of the above referenced conventional technology, it will not be described here. In this discussion, the main focus will be on the construction of the disk chucking mechanism only.

Figure 2:
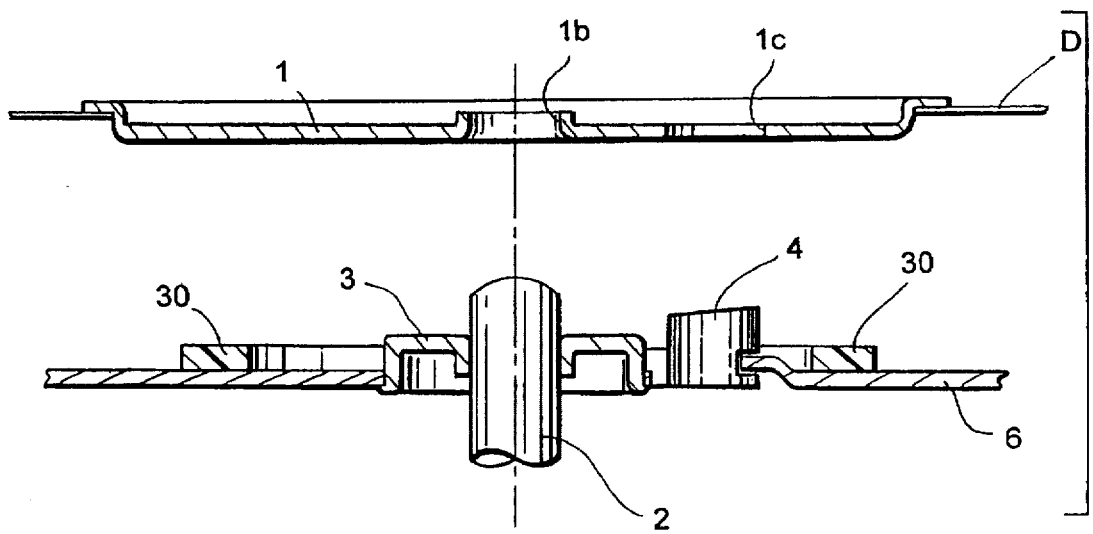
FIG. 2 is a cross section of view X–X' of FIG. 1.

FIG. 1 is a plan view of a working example of the disk chucking mechanism of the present invention, and FIG. 2 shows a cross-section of view X–X' of FIG. 1. In FIGS. 1 and 2, reference numeral 2 is a spindle that engages the center hole 1b of a metallic hub 1 fastened in the center portion of disk D. Secured to this spindle 2, is hub seat 3, on which hub 1 rides. Installed around the outer circumference of hub seat 3 is turntable 6, which rotates as a single unit with hub seat 3. Arranged on turntable 6 are drive pin 4, which engages an off-center hole 1c provided at a location offset from the center of hub 1, to regulate the movement of hub 1, and chucking magnet 29, which magnetically attracts hub 1. Drive pin 4 is provided at one end of a lever 8, which rotates about a support point 7 at its center of rotation. The chucking magnet 29 comprises three magnet pieces 30, 30, and 30, all identical in shape. When put together to form chucking magnet 29, these three magnets are arranged in an approximate circle that has spindle 2 at its center.

Figure 3:
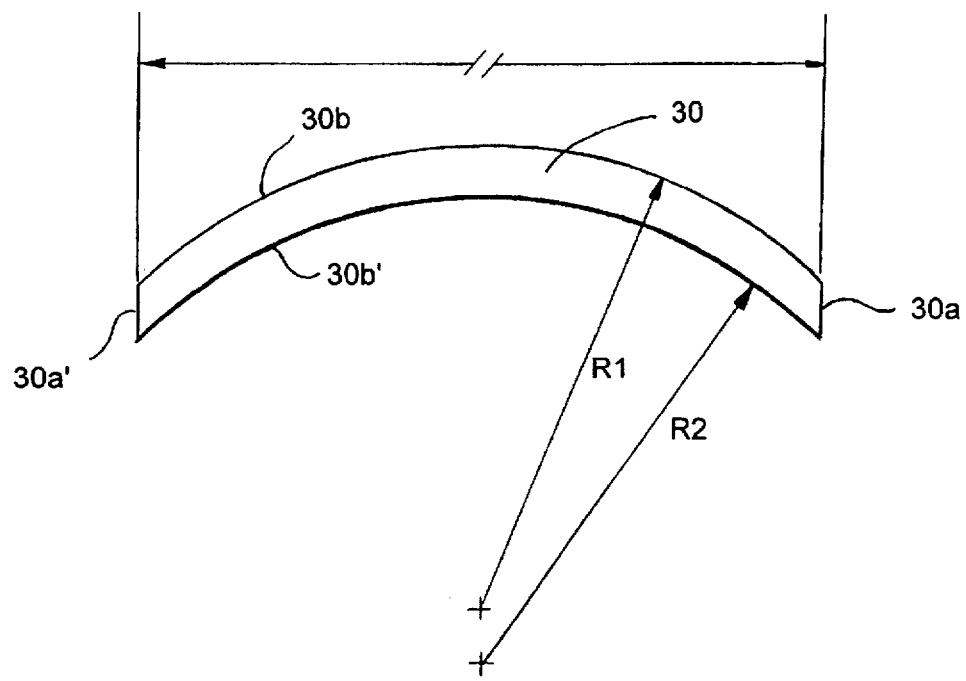
FIG. 3 is a plan view showing a working example of a magnet piece that is used in combination with other magnet pieces to constitute the chucking magnet of a disk chucking mechanism according to the present invention.

Each individual magnet piece 30 has, as shown in FIG. 3, two opposite short sides 30a and 30a' at the left and right sides of the figure, and two opposite long arc sides 30b and 30b' at the top and bottom of the figure. Short sides 30a and 30b are parallel and equal in length, and long sides 30b and 30b' are also equal in length. The length of R1 (the radius of 30b) is the same as that of R2 (the radius of 30b').

Figure 4:
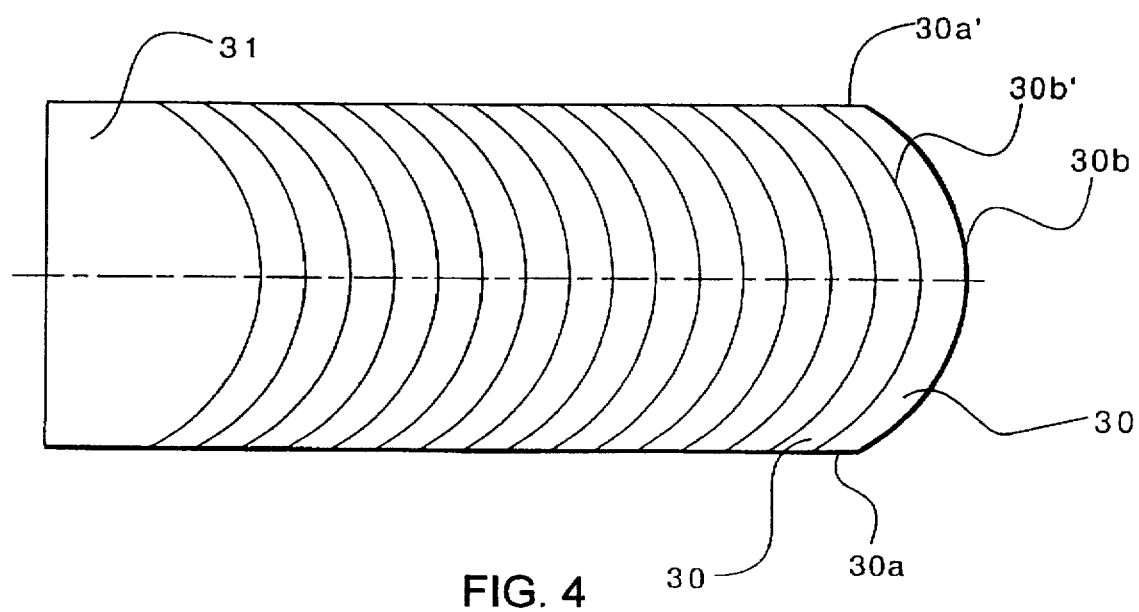
FIG. 4 is a plan view showing a manufacturing process for magnet pieces for use in the above disk chucking mechanism.

Magnet pieces 30 are made by roller-feeding sheet stock 31, a strip of rubber magnet sheet shown in FIG. 4, through a cutter with an arc-shaped blade, and cutting off pieces a width equal to the length of sides 30a and 30a'. Because, as was mentioned above, long sides 30b and 30b' of magnet pieces 30 are arcs of the same length and radius, magnet pieces 30 can be made by cutting off sheet stock 31 at constant-width intervals along a single arc-shaped cut line, thus reducing waste in the use of sheet stock 31. Chucking magnet 29 is now obtained by taking three magnet pieces 30 obtained in this manner, and installing them on turntable 6 surrounding spindle 2, using double-sided tape, adhesive, etc. to bond them to the turntable.

With the disk chucking mechanism configured as described above, since chucking magnet 29 comprises a plurality of identically-shaped magnet pieces 30, excellent yield is obtained from sheet stock 31 for fabrication of magnet pieces 30. It is therefore possible to limit the amount of material wasted during fabrication of the chucking magnets, and thereby contribute to material cost reduction.

Also, while in the above working example, chucking magnet 29 was made up of three magnet pieces 30, there need not necessarily have been three: two magnet pieces could have been used, as could four or more pieces. Note, however, that while increasing the number of magnet pieces 30 makes the inner circumference of chucking magnet 29 a more perfect circle, it also increases the work load in bonding them to turntable 6. This must be considered when determining the optimum number to use.

Figure 5:
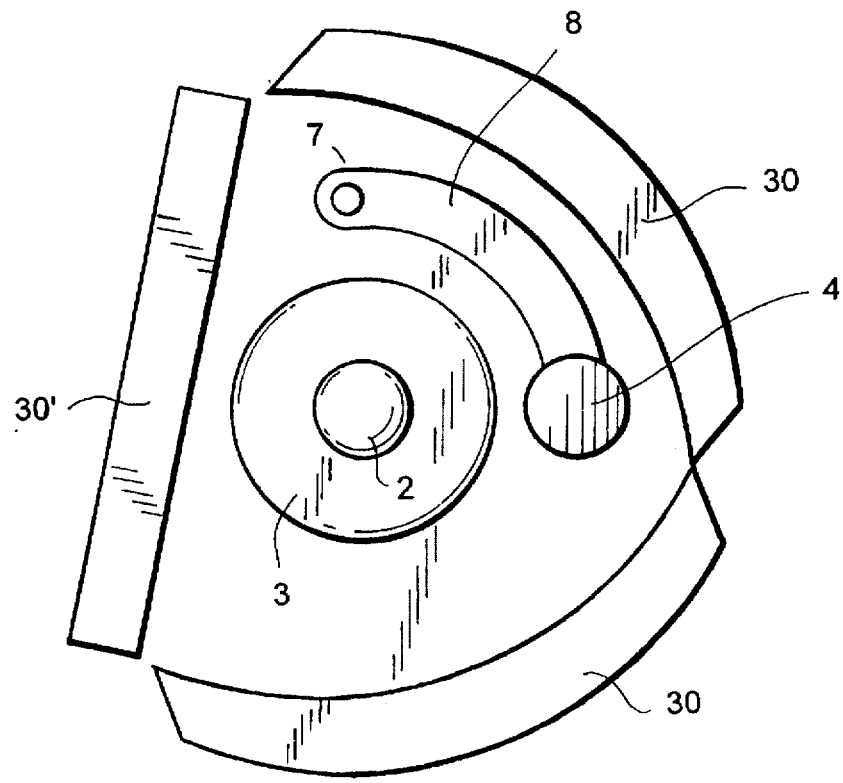
FIG. 5 is a plan view showing another working example of the above disk chucking mechanism.

As shown in FIG. 5, the plurality of magnet pieces 30 that make up chucking magnet 29 need not all be the same shape, as long as at least two of them are the same. In FIG. 5, magnet piece 30', which has a shape different from that of magnet pieces 30, is positioned across spindle 2 from drive pin 4. In this configuration as well, an effective improvement in material yield can still be realized in the forming of magnet pieces 30, as was the case in the above working example.

Figure 6:
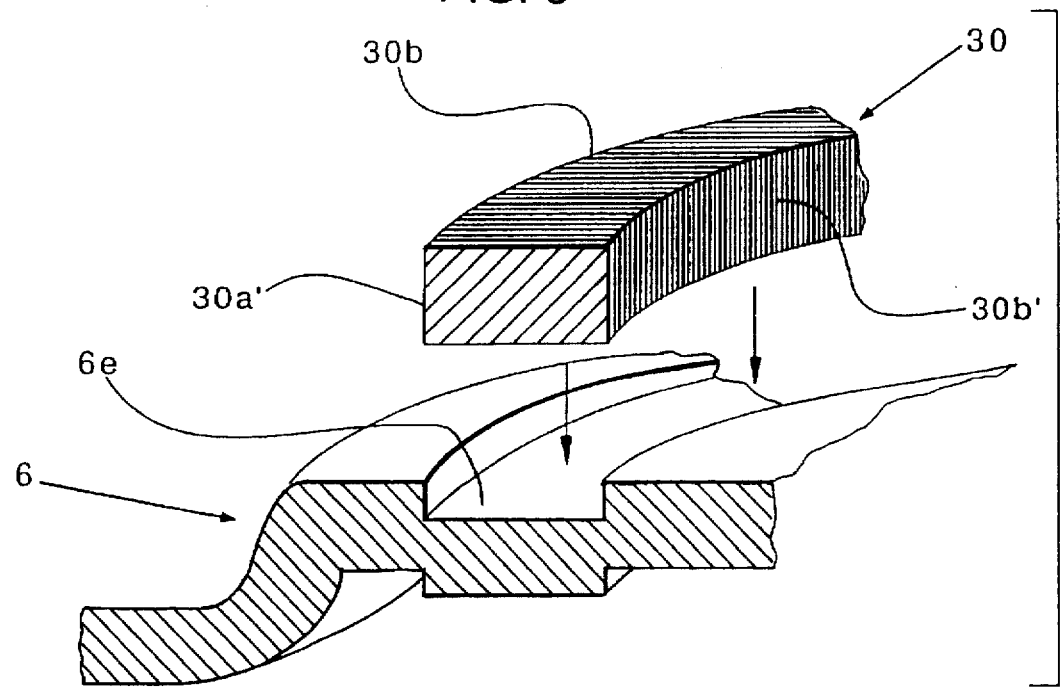
FIG. 6 is an oblique cross section of showing one example of a process for installing magnet pieces in the above disk chucking mechanism.
Figure 7:
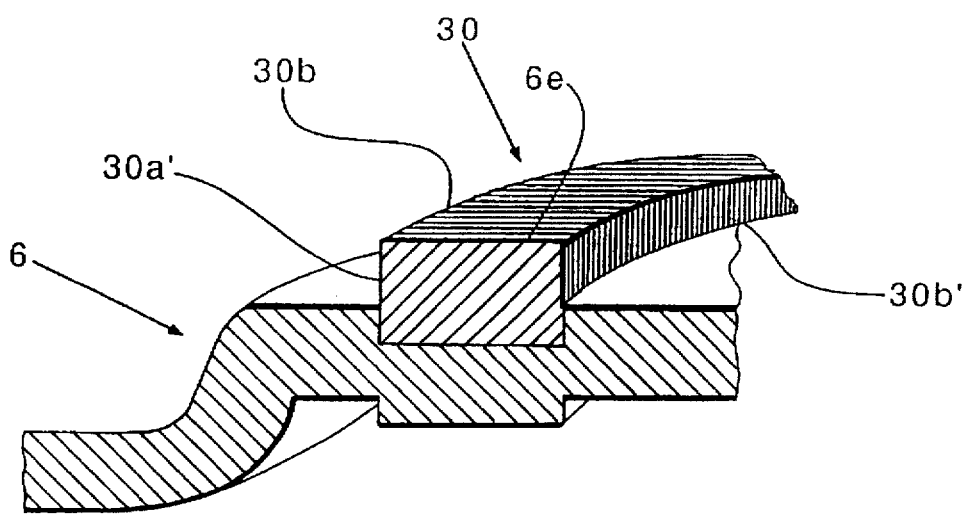
FIG. 7 is an oblique cross section showing the above disk chucking mechanism with magnet pieces installed in it.

A groove 6e, as shown in FIG. 6 and FIG. 7, may be formed in advance in the portion of turntable 6 to which magnet pieces 30 are bonded, with this groove 6e having approximately the same shape as the bottom bonding surface of magnet pieces 30. When magnet pieces 30 are installed on turntable 6, then, they can be installed in this groove 6e, thus making it easier to position magnet pieces 30, and also effecting a more solid installation.

Figure 8:
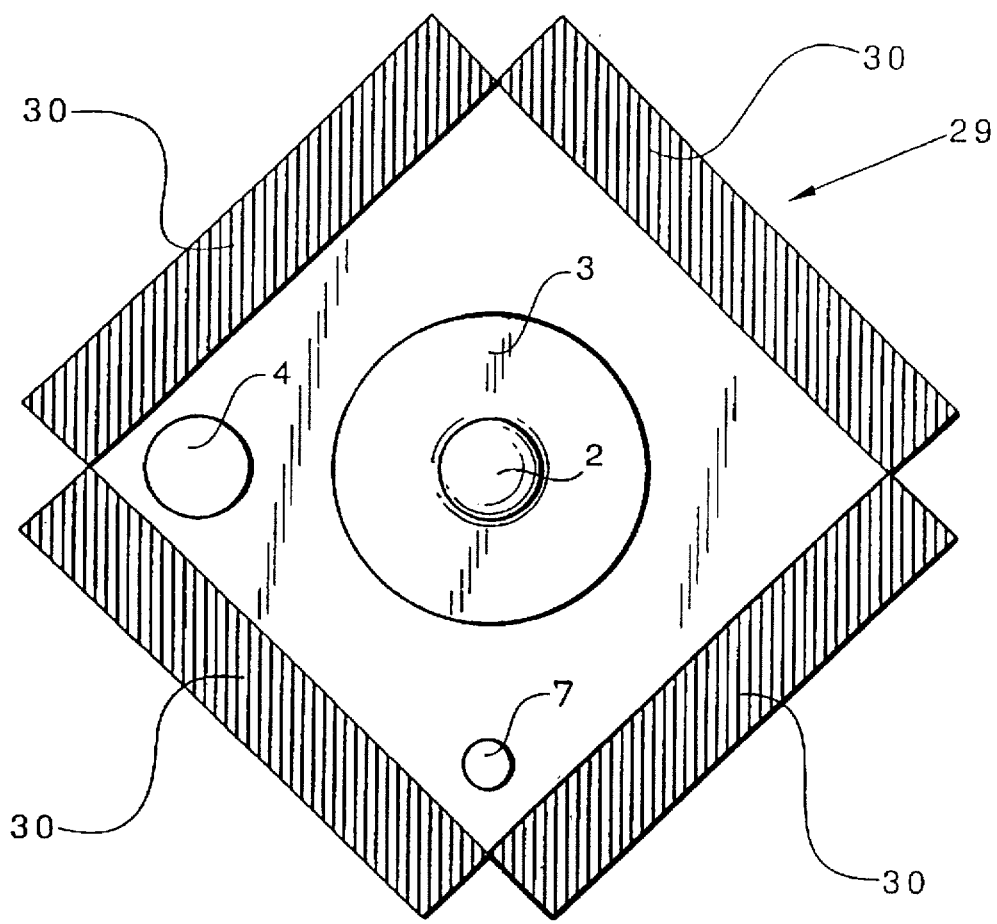
FIG. 8 is a plan view showing another working example of a chucking magnet according to the present invention.
Figure 9A:
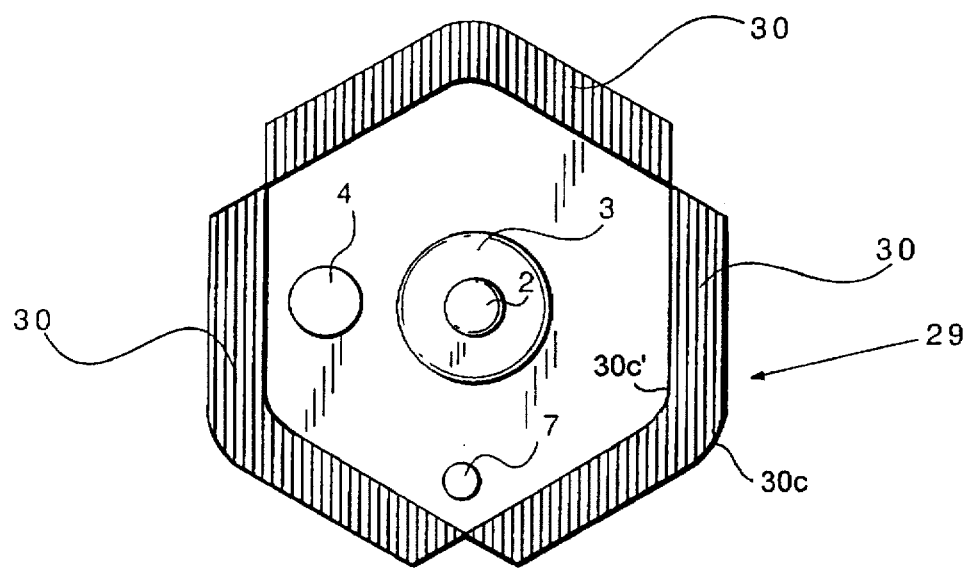
FIG. 9(a) is a plan view showing yet another working example of a chucking magnet according to the present invention.
Figure 9B:
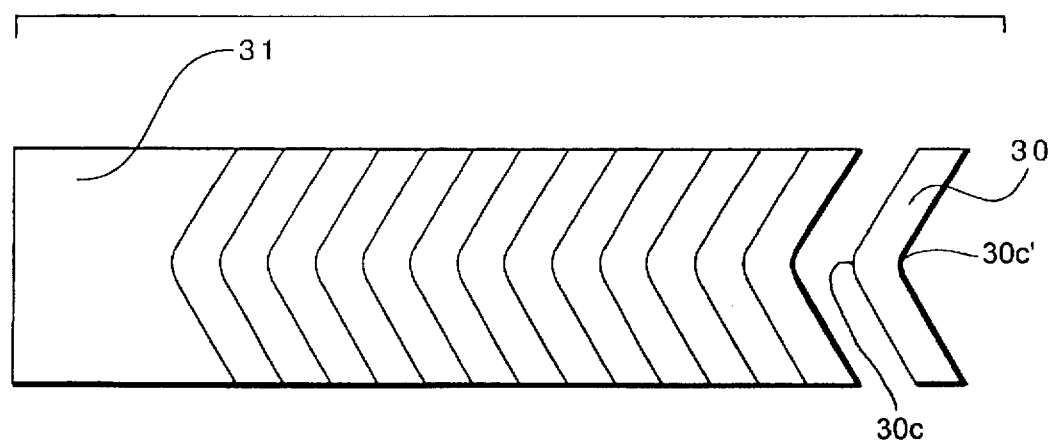
FIG. 9(b) is a plan view showing the manufacture process used to make the magnet pieces.

The shape of magnet pieces 30 need not be confined to that used in the above working examples. Shown in FIG. 8 is chucking magnet 29 circumscribing a rectangle. An alternative of this that can also be used is shown in FIG. 9(a) and (b). In this example, identical V-shaped magnet pieces 30 are cut from sheet stock 31. Three magnet pieces 30 form a chucking magnet 29 roughly circumscribing a hexagon. Opposite angles 30c and 30c' of these magnet pieces 30 are equal angles. In each of these working examples, the opposite short sides of each member 30 are parallel to each other and equal in length, and the opposite long sides are also equal to each other in length.

In addition, as shown in FIG. 10(a) and (b), sheet stock 31 may be cut along longitudinal lines, and along diagonal lines that intersect with each other at these longitudinal lines, so as to form isosceles-triangle-shaped magnet pieces 30. Four of these magnet pieces 30 may then be used to form a chucking magnet 29 circumscribing a square. As an alternate, identically-shaped trapezoidal magnet pieces may be cut from sheet stock 31, and three or four of these magnet pieces 30 used to form a chucking magnet 29.

The locations in which magnet pieces 30 are bonded on turntable 6 need not be concentric with spindle 2, as long as a portion of it is positioned somewhat offset from spindle 2. Thus in FIG. 11, magnet piece 30' is positioned across spindle 2 from drive pin 4 on turntable 6, but with magnet piece 30' located nearer spindle 2 than are magnet pieces 30 and 30.

Figure 12:
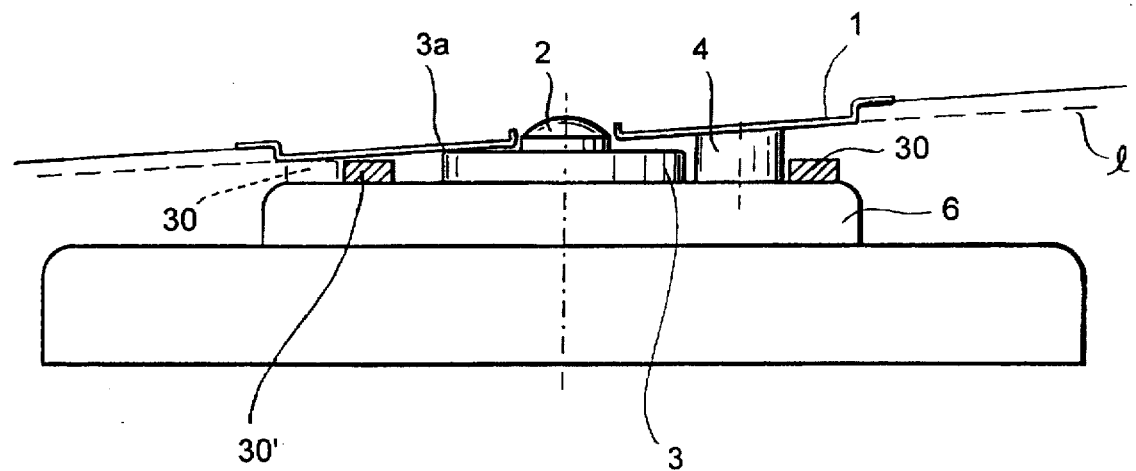
FIG. 12 is a cross section view of the disk chucking mechanism according to the present invention.
Figure 13:
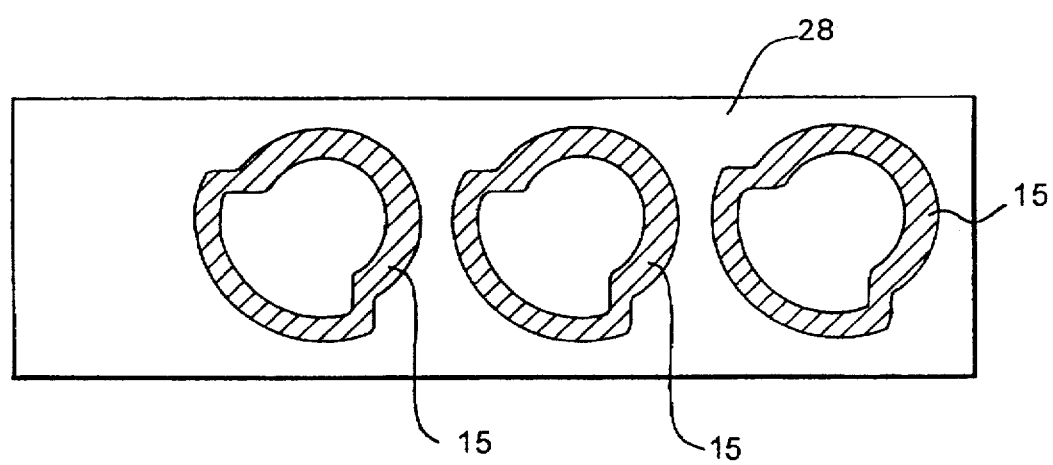
FIG. 13 is a plan view showing a manufacturing process for making the chucking magnets used in conventional disk chucking mechanism.

The reasons for this will now be explained. For the motor to drive the disk, the drive pin provided on the turntable must engage the off-center hole in a hub fastened in the center of the disk. When a floppy disk is inserted into the disk drive, however, it is not necessarily inserted such that the drive pin is in position to engage the off-center hole in the hub. The disk does not actually start turning until the drive pin engages the off-center hole during the first revolution of the motor following insertion of the disk. In other words, from the time the floppy disk is inserted until the drive pin engages the off-center hole, one side of the hub is sitting on the top of drive pin 4, as shown in FIG. 12. At this time, when the plurality of magnet pieces 30 are positioned in an approximate circle concentric with the hub, as shown in FIG. 1, if the magnetic attraction of the magnet piece 30 located across spindle 2 from drive pin 4 is too strong, it could prevent drive pin 4 from engaging the off-center hole, even when it is in position to do so, and the drive would then simply run in place, without ever turning hub 1. If this "running-in-place" condition persists, the magnet piece 30 diagonally across from drive pin 4 will rub against hub 1. The resulting abrasion would produce filings that could impair the ability of the disk to properly record and playback data. This phenomenon occurs, however, only when the magnet attraction of magnet pieces 30 across from drive pin 4 is made stronger that it needs to be. If magnet pieces 30 are magnetized to an appropriate level of magnetic strength, the arrangement shown in FIG. 1 can be used without problems.

In FIGS. 11 and 12, chucking magnet 29 is made up of three magnet pieces 30, 30, and 30'. The two magnet pieces 30 and 30 are each placed with one end positioned close to drive pin 4. Magnet piece 30' is positioned across spindle 2 from drive pin 4, approximately two to four millimeters closer to drive pin 4 than are the other two magnet pieces 30, 30. Putting magnet piece 30' closer to spindle 2 increases the amount of space that will exist between magnet piece 30' and hub 1 when hub 1 is sitting on top of drive pin 4, thus weakening the magnetic attraction on hub 1. This eliminates the "running-in-place" problem, in which the drive pin fails to engage the off-center hole of hub 1 even when it is in position to do so, and drive pin 4 always engages the off-center hole during the first revolution of the motor following insertion of the disk, thus providing more positive chucking.

Preferably, magnet piece 30', the magnet piece positioned diagonally across from drive pin 4, should not be allowed to touch an imaginary line 1 (shown in FIG. 12) drawn through the tip of drive pin 4 and corner 3a across from hub seat 3. This will ensure that hub 1 will not contact magnet piece 30', thus preventing wear of magnet piece 30' and hub 1.

Also, while the three magnet pieces 30, 30 and 30', shown in FIG. 11, all have the same shape, any one of the pieces could have had a different shape.

In the above discussion, the invention made by the present inventor was described in concrete terms, based on working examples. It goes without saying, however, that the invention is not confined to the examples described here, but could well be modified in a variety of ways without deviating from the scope of the gist of the invention. For instance, in the above examples, the structure was one in which turntable 6 was fastened to the outer circumference of hub 3, which in turn was fitted onto spindle 2. It goes without saying however, that the same results could be achieved with turntable 6 and hub 3 being fabricated as a single unit, using a sheet metal forming process, etc.

Also, turntable 6 could be a rotor case, such as reference numeral 22 in FIG. 5 of U.S. Pat. No. 5,311,383, in which drive magnets are mounted around the inside of the rotor case outer circumference; or it could be a rotor having no drive magnets mounted on it, such as reference numeral 504 in FIG. 11 of the above U.S. Pat. No. 5,311,383.

The present invention employs a chucking magnet made up of a plurality of magnet pieces. Therefore, when the magnet pieces are obtained by cutting them from sheet stock, the shape of the pieces can be designed to improve yield. This reduces scrap, thereby contributing to material cost reduction.

Also, by positioning the magnet piece located across the spindle from the drive pin closer to the spindle than the other magnet pieces, positive chucking between the drive pin and the off-center hole of the disk is also provided.

While the foregoing description and drawings represent the preferred embodiments of the present invention, it will be obvious to those skilled in the art that various changes and modifications may be made therein without departing from the true spirit and scope of the present invention.

What is claimed is:

1. A disk chucking mechanism comprising:

a spindle for engaging the center hole of a metallic hub fastened in the center portion of a disk;

a turntable that rotates as a single unit with said spindle;

a drive pin for engaging an off-center hole provided in said hub at a location off-center with respect to the center of said hub for regulating the movement of said hub; and a chucking magnet fastened on the top of said turntable for magnetically attracting said hub, said chucking magnet having a plurality of magnet pieces wherein the magnet piece positioned opposite said drive pin with said spindle disposed therebetween is placed nearer said spindle than are the other of said magnet pieces and wherein at least two of said magnet pieces in said chucking magnet are identical in shape.

2. The disk chucking mechanism according to claim 1 wherein in the portion of said turntable in which said magnet pieces are installed, a groove is provided for positioning said magnet pieces.

3. The disk chucking mechanism according to claim 2, wherein said groove of said turntable is of the same approximate shape as the bottoms of said magnet pieces.

4. The disk chucking mechanism according to claim 1, wherein said chucking magnet comprises three magnet pieces, two of said three magnet pieces being placed with one end of each positioned near said drive pin, and the other magnet piece being placed nearer said spindle than said two magnet pieces.

5. A disk chucking mechanism comprising:

a spindle for engaging the center hole of a metallic hub fastened in the center portion of a disk;

a turntable that rotates as a single unit with said spindle;

a drive pin for engaging an off-center hole provided in said hub at a location off-center with respect to the center of said hub for regulating the movement of said hub; and a chucking magnet fastened on the top of said turntable for magnetically attracting said hub, said chucking magnet having a plurality of magnet pieces wherein the magnet piece positioned opposite said drive pin with said spindle disposed therebetween is placed nearer said spindle than are the other of said magnet pieces and wherein all chucking magnet pieces are identical in shape.

6. The disk chucking mechanism according to claim 5, wherein in the portion of said turntable in which said magnet pieces are installed, a groove is provided for positioning said magnet pieces.

7. The disk chucking mechanism according to claim 6, wherein said groove of said turntable is of the same approximate shape as the bottoms of said magnet pieces.

8. The disk chucking mechanism according to claim 5, wherein said chucking magnet comprises three magnet pieces, two of said three magnet pieces being placed with one end of each positioned near said drive pin, and the other magnet piece being placed nearer said spindle than said two magnet pieces.

9. A disk chucking mechanism comprising:

a spindle for engaging the center hole of a metallic hub fastened in the center portion of a disk;

a turntable that rotates as a single unit with said spindle;

a drive pin for engaging an off-center hole provided in said hub at a location off-center with respect to the center of said hub for regulating the movement of said hub; and a chucking magnet fastened on the top of said turntable for magnetically attracting said hub, said chucking magnet having a plurality of magnet pieces wherein the magnet piece positioned opposite said drive pin with said spindle disposed therebetween is placed nearer said spindle than are the other of said magnet pieces and wherein said magnet pieces have opposite short sides that are parallel with each other, are of the same length and have opposite long sides that are arcs of the same radius.

10. The disk chucking mechanism according to claim 9, wherein in the portion of said turntable in which said magnet pieces are installed, a groove is provided for positioning said magnet pieces.

11. The disk chucking mechanism according to claim 10, wherein said groove of said turntable is of the same approximate shape as the bottoms of said magnet pieces.

12. The disk chucking mechanism according to claim 9, wherein said chucking magnet comprises three magnet pieces, two of said three magnet pieces being placed with one end of each positioned near said drive pin, and the other magnet piece being placed nearer said spindle than said two magnet pieces.

* * * * *